July 9, 1935.　　　G. A. CLEMENT　　　2,007,366
MANUFACTURE OF LENSES
Filed Dec. 7, 1933　　　2 Sheets-Sheet 1
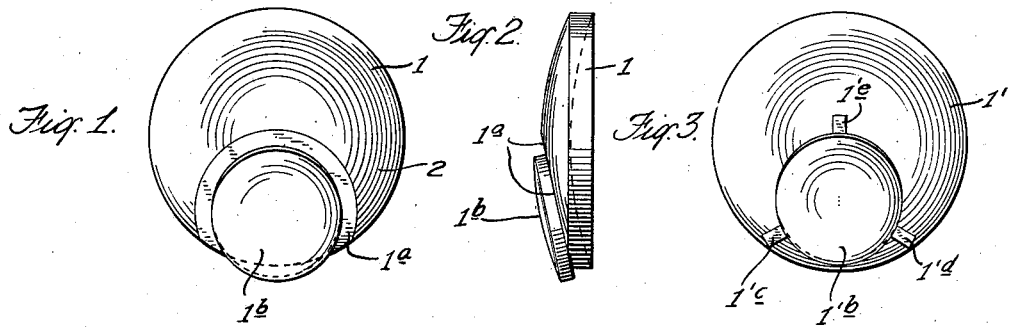
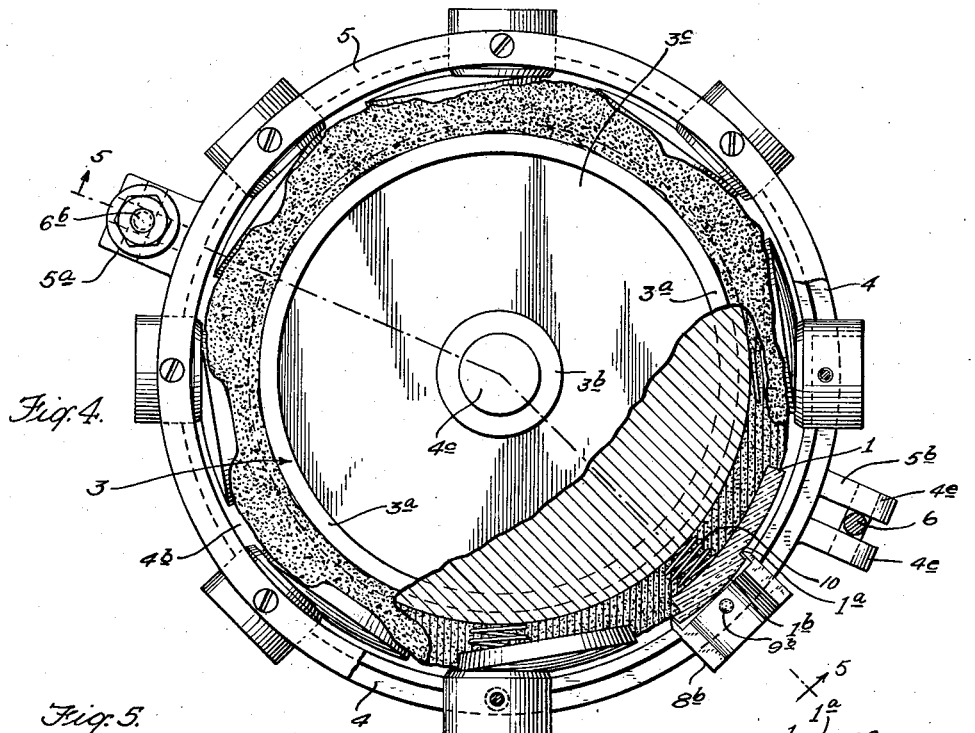
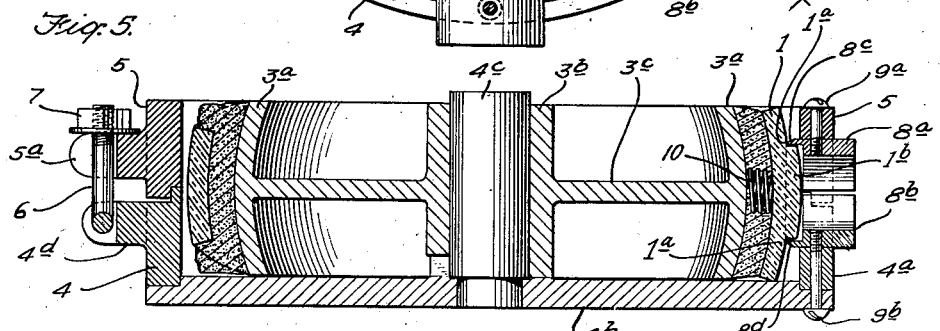
INVENTOR
GEORGE A. CLEMENT.
BY
Victor D. Borst
ATTORNEY

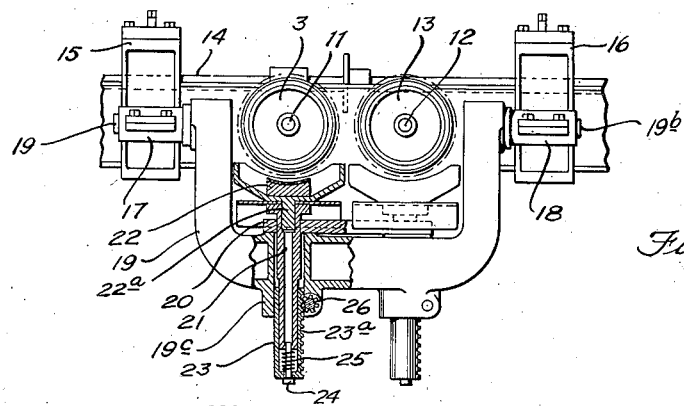

Patented July 9, 1935

2,007,366

UNITED STATES PATENT OFFICE 2,007,366

MANUFACTURE OF LENSES

George A. Clement, Mount Vernon, N. Y.

Application December 7, 1933, Serial No. 701,293

10 Claims. (Cl. 51—278)

The invention herein disclosed relates to the art of manufacturing lenses, particularly fused lenses.

The ordinary fused lens consists of a major portion and a minor portion which is made up of a section of the major portion and a segment which is fused to the major portion. In manufacturing such lenses, for example, a bifocal lens, a countersink is ground in the major portion of the lens blank. In this countersink there is mounted a segment, usually of a glass having a different index of refraction from the index of refraction of the major portion. Thus positioned, the segment or button is fused to the major portion and forms with the section to which it is fused a minor portion in the lens blank. The lens blank so formed is ground to a smooth curve and the minor portion formed by fusing the segment to the major portion is of a different focal length than the major portion of the lens. In grinding such lens blanks, it is necessary to control accurately the ultimate size of the minor portion in the finished lens. Heretofore, in order to do this, the lens blanks have been ground separately and the size of the minor portion is checked at frequent intervals by measuring it. When lenses are ground in this manner, there are many which can not be used because the minor portion is ground too small and the grinding tools quickly lose their shape and cause a variation in the lens surface. Frequent turning and truing of the grinding tools is consequently necessary. Because of these conditions and because the grinding of lens blanks in this manner is necessarily slow, lenses of this type are very expensive.

By the invention herein disclosed, several such lens blanks can be ground together and the ultimate size of the minor portion accurately controlled without the necessity of frequent measurements. In accordance with the invention, the major and minor portions are fused together and several fused lens blanks are positioned with respect to an axis in accordance with the amount to be ground therefrom, and so positioned, the lens blanks are mounted upon a block. The several lens blanks mounted on the block are ground together, the extent of the grinding being limited in accordance with the desired ultimate size of the minor portion.

The invention is practiced, for example, by grinding the counter sink in the lens blank so that the area of the ground surface is greater than the area of the segment to be fused thereto, thus providing a ground surface which extends radially beyond the segment which is placed thereon. This extended surface may be continuous or interrupted, but forms an accurate abutment surface suitable for use as a gauge in mounting the lens blanks upon a block. This abutment surface may be provided by grinding the countersink so that the ground surface thereof is of a greater diameter than the segment to be fused to the lens blank. The segment is accurately centered in the countersink and, so centered, is fused to the lens blank. Several such lens blanks are mounted on a device having abutments accurately positioned from an axis. These abutments receive the segment fused on to the lens blank and abut against the extended surface of the countersink. When the lens blanks are mounted against these abutments, sections of the countersinks of equal diameters are positioned equidistant from an axis. So positioned, the lens blanks are mounted upon a substantially cylindrical grinding block. As mounted upon this grinding block, the several lens blanks are ground together, the grinding tool being pre-set so that it can move towards the grinding block only a certain distance, this distance being such that the minor portion of the lens blanks will be of a certain diameter when the grinding tool has reached its limit of movement towards the block of lenses. Obviously, due to the positioning of the lenses with respect to their countersinks, this position will be the same for all of the lenses.

The apparatus which is utilized in carrying out this method is illustrated in the accompanying drawings and from this illustration and the following detailed description of the apparatus, a clearer understanding of the invention may be had.

In the drawings:

Fig. 1 is a front elevation of a lens blank prepared in accordance with this invention;

Fig. 2 is a side elevation of the same;

Fig. 3 is a front elevation of a modified form of lens blank;

Fig. 4 is a plan of a lens mounting device;

Fig. 5 is a section of the same taken on the irregular line 5—5 of Fig. 4;

Fig. 6 is a front elevation of a grinding machine;

Fig. 7 is a plan, partly in section, of a modified form of lens mounting device; and Fig. 8 is an elevation, partly in section, of the mounting device illustrated in plan in Fig. 7.

In Figs. 1 and 2 there is disclosed a fused bifocal lens blank which has been prepared so that it may be properly mounted and ground together with several other such lens blanks. This lens blank includes a major portion 1 which in the finished lens forms the portion for distant vision, and a minor portion 2 which in the finished lens forms the reading section of the lens. The minor portion is made up of a section 1a of the major portion and a segment or button 1b fused to the section 1a of the major portion. In preparing this lens blank, the section 1a of the major portion 1 is ground to form a countersink therein of a definite curvature. The surface of this countersink is in the form of a sector of a sphere and the outside diameter of this surface is greater than the diameter of the segment 1b. The segment 1b is mounted on the major portion 1 and accurately centered with respect to the countersink in the section 1a thereof. So positioned, the segment is fused to the major portion 1. The ground surface forming a portion of the countersink in the major portion 1 which extends beyond the segment 1b constitutes an accurate abutment surface for the purpose of positioning the lens blank to mount it upon a grinding block as will hereinafter be described.

Lens blanks as shown in Fig. 3 may also be provided with an accurate abutment surface. On the surface of the major portion 1' of the lens blank as shown in Fig. 3, there are molded three radial lugs 1'c, 1'd and 1'e which are partially contained in the section of the major portion 1' to which the segment 1'b is fused. The lugs are separated from adjacent lugs on either side through an angle of 120° and they are thus uniformly distributed about the countersink section of the blank 1'. When the countersink is ground, the surfaces of these lugs, because of their elevation above the surface of the lens blank, are also ground. The actual diameter of the countersink in the blank 1' however is made equal to the button or segment 1'b which is accurately centered thereon and fused thereto. The ground surfaces of the lugs extending beyond the edge of the countersink form accurate abutment surfaces similar to the surface of the blank 1 which extends beyond the segment 1b.

One of the mounting blocks 3 upon which several lens blanks are mounted is shown in Fig. 4 positioned in a mounting device. The mounting block is circular in plan and includes a transversely curved outer flange 3a, a central hub 3b and a web 3c connecting the hub and the flange. The mounting device consists of a lower section 4 which includes a ring 4a, a circular plate 4b secured to one end of the ring 4a and a spindle 4c extending from and secured in the plate 4b at the center thereof which spindle extends into the hub 3b of the mounting block and positions the mounting block in the mounting device. This ring cooperates with an upper section or ring 5 with which it connects in an overlapping flange connection. The ring 4a has a pair of bifurcated lugs, 4d and 4e, extending radially therefrom at diametrically opposite points. Bolts 6a and 6b are pivotally mounted between the arms of the bifurcated lugs 4d and 4e and may be positioned to extend between the arms of correspondingly positioned bifurcated lugs 5a and 5b extending from the ring 5. Nuts 7 on the bolts 6a and 6b secure the two rings together in edge to edge relation. Uniformly distributed about the rings 4a and 5, there are a plurality of notches cut through in abutting edges of the rings. Each opening in each ring is semicircular so that when the two rings are secured together by the bolts 6a and 6b, there is formed a number of circular openings through the connected rings. In each semicircular opening in each ring there is mounted a semicylindrical sleeve. Each of these semicylindrical sleeves is similar to the semicylindrical sleeves 8a and 8b illustrated in section in Fig. 5. It will be noted that when the two rings are together two such semicylindrical sleeves as, for example, the sleeves 8a and 8b, form a cylindrical sleeve. Each semicylindrical sleeve has a knife edge such as the knife edges 8c and 8d formed on the radially inner ends of the sleeves 8a and 8b. The knife edge of each pair of opposed sleeves forms an accurate circle of a definite diameter and the internal diameter of the sleeve at the inner edge is sufficient to receive the segment 1b of the fused lens blank. The sleeves are held in the openings in the rings by machine screws such as the machine screws 9a and 9b illustrated in Fig. 5. The knife edges of these sleeves are normally positioned equidistant from the axis of the spindle 4c.

In mounting the lens blanks upon the mounting block, the block is placed in the position in which it is shown in Figs. 4 and 5. While in this position the segment 1b of a lens blank is placed in each one of the cylindrical sleeves of the mounting device and the edge of the lens blank in contact with the plate 4b. A spring such as the spring 10 illustrated in Fig. 4 placed between the lens blank 1 and the surface of the flange 3a forces the lens blank against the knife edge on the sleeve 8. Since the ground surface of the minor portion which extends beyond the segment 1b is accurately ground, and the knife edges of the sleeve are accurately positioned, the plane parallel to the segment which cuts the countersink surface of the minor portion at the point engaged by the knife edge of the sleeve will be located at the knife edge. Thus, if the knife edge of each of the sleeves in the mounting device is distant from the axis of the mounting block an equal amount, the countersink surface of the several lens blanks abutting against the sleeves will be so positioned that planes tangential to the mounting block and cutting sections of equal diameter on the countersink surfaces of the several lens blanks will be equidistant from the axis of the mounting block. In other words, if the several lenses are secured on the mounting block and are ground so that they form an outer surface of a true circle, the diameter of all the countersink sections or minor portions will be equal. When the lenses are thus positioned by virtue of the spring pressing the countersink surface of the several lenses against the knife edges of the sleeves, the several lenses are secured to the mounting block by means of pitch which is poured in a fluid state and solidifies and secures the lens blanks to the mounting block.

After the lenses are mounted on the block, the bolts 6a and 6b are loosened and the upper ring is removed. The block with the lenses thereon can then be removed from the mounting device. The block with the lens blanks mounted thereon is then placed upon the spindle of a grinding machine such as that of which a fragmentary portion is illustrated in Fig. 6. In the machine illustrated in Fig. 6, which machines are well known to those skilled in the art, the mounting block with the lens blanks thereon is mounted upon a spindle 11 which is rotated continuously. A similar spindle 12 carries another mounting block 13 having lens blanks mounted thereon. These spindles extend from, and perpendicular to a frame member 14. The frame member 14 has a pair of brackets 15 and 16 which support bearings 17 and 18. In the bearings 17 and 18 there are mounted the trunnions 19a and 19b of a yoke 19. The yoke 19 which is oscillated about the trunnions 19a and 19b during the grinding operation, carries two lap grinders, one for each of the spindles 11 and 12. The two lap grinders are identical.

The lap grinder to the left in Fig. 6 is illustrated in section and will be described. Mounted upon the yoke frame there is a guide plate 20. Extending through this guide plate and a hub 19c formed in the yoke there is a hollow grinder-lap stem 21 which supports on its upper end a grinder lap 22. The grinder lap 22 has a spindle 22a which extends into the upper open end of the grinder-lap stem. Extending from the lower end of the hub 19c, there is a cup-shaped casing 23. The lower end of the grinder-lap stem extends into this cup-shaped casing. A retaining screw 24 extends through and is slidable in an opening in the bottom of the casing 23 and engages the threads of a threaded opening in the bottom of the grinder-lap stem 21. A spring 25 acts between the bottom of the grinder-lap stem and the bottom of the casing 23 and thus tends to press the grinder-lap stem upwardly so as to bring the grinder lap into contact with the lenses mounted upon the block 3. The amount that the grinder lap can move upwardly is limited by the retainer screw 24. This however may be adjusted through teeth 23a formed on the side of the casing 23. These teeth engage a pinion 26 through which the casing 23 may be moved vertically. In grinding the lenses, the amount to be ground therefrom, that is, the ultimate distance from the axis of the block 3 on which the lens blanks are mounted to the outer surface of the lens, which is required to produce a minor portion of a given diameter, is calculated and the grinder-lap stem and casing 23 are so positioned that when the amount ground is sufficient to produce a minor portion of the given requisite diameter, the grinder lap can not move any farther toward the lenses. It is to be noted that the yoke is oscillated and the block rotated while the grinding is being done so that a toric curve is generated.

When the lens blanks have been ground the proper amount, the block 3 may be removed from the grinding machine and the pitch again rendered fluid so that the lens blanks and the springs 10 may be removed.

In Figs. 7 and 8, there is illustrated a modified form of mounting device. This modified form of mounting device is illustrated in conjunction with a grinding block having the shape of a sector of a sphere. The mounting device includes a hollow case 27 having a portion 27a of the inner surface thereof in the form of a sector of a sphere. Extending through this casing at spaced intervals and radially of the surface 27a there are a plurality of openings in each of which a sleeve is received. The several sleeves are exactly the same as the sleeve 28 illustrated in plan in Fig. 7 and in section in Fig. 8. The sleeve 28 is cup-shaped and on the inner end there is formed a knife edge 28a which, as in the case of the mounting device illustrated in Fig. 4, abuts against the abutting surface formed on the lens blank. A flange 28b adjacent the inner end of the sleeve is imbedded in the surface of the case 27 and is secured thereto by machine screws 29. Within the sleeve 28 and extending through an opening in the bottom thereof, there is a hollow spindle 30. On the inner edge of this spindle there is mounted a rubber bushing 31 having an inwardly extending section 31a of greater internal diameter which extends beyond the end of the spindle 30. Behind this rubber bushing 31, there is a hollow block 32 which is secured on to the spindle and forms an abutment which abuts against the end wall of the sleeve 28. The outer or free end of the spindle 30 is reduced in diameter and mounted on the spindle and abutting against the shoulder formed by the reduction in diameter there is a bar 33. A spring 34 acting between the bar 33 and the bottom of the sleeve 28 tends to force the spindle out of the sleeve 28 and the abutment 32 against the bottom of the sleeve. Received over the reduced end of the spindle 30 is the end of a flexible tube 35 which is also connected to a source of reduced pressure.

When the segment of a lens blank, such as the segment 36a of the lens blank 36, is placed in the sleeve 28, the spindle 30 is moved inwardly against the action of the spring 34, by pressing on the bar 33, until the rubber bushing 31 engages the segment. When the rubber bushing 31 engages the segment the reduced pressure in the spindle causes the rubber bushing to adhere to the segment 36a. The pressure on the bar 33 is then released and the lens blank is held against the knife edge of the sleeve through the pressure exerted by the spring 34. Centrally of the case 27 there is an abutment 27b against which the edges of the lens may abut so that all of the lens blanks will be positioned in the same manner. When the several lenses are held against the knife edges of the sleeves 28 by the reduced pressure, a mounting block 37 having a spherical surface is placed in the casing 27 and secured to the lens blanks by means of pitch 29. When the pitch is hardened, the source of reduced pressure is cut off and the lenses are thus released and the mounting block 37 can be removed with the lenses mounted thereon. So mounted, the lenses can be ground in the well known lap grinding machines similar to that illustrated in Fig. 6.

It is obvious that various changes may be made by those skilled in the art in the steps of the method herein described and the details of the apparatus used in carrying out the method within the principle and scope of the invention as expressed in the appended claims.

I claim:

1. The method of manufacturing fused lens blanks which method includes grinding a countersink in the lens blank and extending the ground surface beyond the edges of the segment, mounting and fusing the segment concentric with the countersink, placing the extended surface of the countersink of several such lens blanks against abutments mounted equidistant from an axis, mounting the lens blanks so related upon a block, and grinding the several lens blanks together.

2. The method of manufacturing fused lens blanks which method includes grinding a countersink in the lens blank of larger diameter than the segment to be fused thereto, mounting and fusing the segment concentric with the countersink, placing the surface of the countersink extending beyond the segments of several such lens blanks against angularly spaced abutments mounted equidistant from an axis, mounting the lens blanks while so related upon a circular block, and grinding the several lens blanks together.

3. The method of manufacturing fused lens blanks which method includes grinding a countersink in the lens blank of larger diameter than the segment to be fused thereto, mounting and fusing the segment concentric with the countersink, placing the surface of the countersink extending beyond the segments of several of such lens blanks against angularly spaced abutments mounted equidistant from an axis, mounting the lens blanks while so related upon a circular block, and rotating the block in contact with a grinding tool.

4. A device for blocking fused lens blanks for grinding comprising a temporary support for several lens blanks having a surface complementary to the grinding surface, means for positioning several lens blanks on the support related in accordance with the countersink sections thereof, and means for holding the lens blanks so positioned while being mounted upon a block.

5. A device for blocking fused lens blanks for grinding comprising a temporary support for several lens blanks having a surface complementary to the grinding surface, means for positioning several lens blanks on the support including positioning abutments adapted to extend from the surface of the support and engage the surface of the lens blank adjacent the segment, and means for holding the lens blanks against the abutments while being mounted upon a block.

6. A device for blocking fused lens blanks for grinding comprising a temporary support for several lens blanks having a surface shaped similar to the surface to be ground, means for positioning several lens blanks on the support including several hollow positioning abutments each adapted to receive a segment of a lens blank and engage the surface of the lens blank adjacent the segment, and means for holding several lens blanks so positioned while being mounted upon a block.

7. A device for blocking fused lens blanks for grinding comprising a temporary support for several lens blanks having a surface similar to the surface to be ground, means for positioning several lens blanks on the support including several hollow positioning abutments mounted for movement lateral to the surface of the support, each abutment being adapted to receive a segment of a lens blank and engage the surface of the lens blank adjacent the segment and means for securing each hollow abutment against movement relative to the surface of the support, and means for holding a lens blank against an abutment while mounting the blank upon a block.

8. A device for blocking fused lens blanks for grinding comprising a hollow, circular, temporary support for several lens blanks having a plurality of angularly spaced openings through the wall thereof, means for positioning several lens blanks on the support including several hollow positioning abutments, each abutment extending through and being slidable in an opening in the support, each abutment being adapted to receive a segment of a lens blank and engage the surface of the lens blank adjacent the segment and means for securing each hollow abutment against movement relative to the surface of the support, and means for holding a lens blank against an abutment while mounting the blank upon a block.

9. The method of manufacturing fused lens blanks which method includes grinding a countersink in the lens blank and extending the ground surface beyond the edges of the segment, mounting and fusing the segment concentric with the countersink, placing the extended surface of the countersink of the lens blank against an abutment to position the lens blank, mounting the lens blank so positioned upon a block, and grinding the lens blank so mounted.

10. A device for mounting fused lens blanks for grinding comprising a temporary support, means for positioning a lens blank on the support including a positioning abutment adapted to extend from the surface of the support and engage the surface of the lens blank adjacent the segment, and means for holding the lens blank against the abutment while being mounted for grinding.

GEORGE A. CLEMENT.